(12) United States Patent
Shi et al.

(10) Patent No.: US 11,328,708 B2
(45) Date of Patent: May 10, 2022

(54) SPEECH ERROR-CORRECTION METHOD, DEVICE AND STORAGE MEDIUM

(71) Applicant: BEIJING BAIDU NETCOM SCIENCE AND TECHNOLOGY CO., LTD., Beijing (CN)

(72) Inventors: Yingchao Shi, Beijing (CN); Jizhou Huang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 15 days.

(21) Appl. No.: 16/930,223

(22) Filed: Jul. 15, 2020

(65) Prior Publication Data

US 2021/0027766 A1  Jan. 28, 2021

(30) Foreign Application Priority Data

Jul. 25, 2019  (CN) .......................... 201910677736.5

(51) Int. Cl.
| | |
|---|---|
| *G10L 15/22* | (2006.01) |
| *G10L 15/06* | (2013.01) |
| *G10L 15/00* | (2013.01) |
| *G10L 15/18* | (2013.01) |

(52) U.S. Cl.
CPC .......... *G10L 15/063* (2013.01); *G10L 15/005* (2013.01); *G10L 15/1815* (2013.01)

(58) Field of Classification Search
None
See application file for complete search history.

(56) References Cited

U.S. PATENT DOCUMENTS

| | | | | |
|---|---|---|---|---|
| 6,848,080 | B1 * | 1/2005 | Lee ...................... | G06F 40/216 |
| | | | | 715/203 |
| 7,165,019 | B1 * | 1/2007 | Lee ...................... | G06F 40/53 |
| | | | | 704/2 |
| 9,437,191 | B1 * | 9/2016 | Chen ..................... | G10L 15/22 |
| 9,684,641 | B1 * | 6/2017 | Hamaker ............... | G06F 40/197 |

(Continued)

FOREIGN PATENT DOCUMENTS

| | | |
|---|---|---|
| CN | 103903611 A | 7/2014 |
| CN | 103944983 A | 7/2014 |

(Continued)

OTHER PUBLICATIONS

Chinese Patent Application No. 201910677736.5 Office Action dated Jun. 11, 2021, 10 pages.

(Continued)

*Primary Examiner* — Jakieda R Jackson
(74) *Attorney, Agent, or Firm* — Lathrop GPM LLP

(57) ABSTRACT

The present disclosure provides a speech error-correction method, device and storage medium. The method includes: determining at least one language type to which a present query speech belongs according to the present query speech of a user, and user description information, wherein the language types include mandarin and at least one dialect; determining each speech error-correction model corresponding to each language type; performing speech analysis on the present query speech by using the determined speech error-correction models, and performing speech error-correction based on a result of the speech analysis.

16 Claims, 2 Drawing Sheets determining at least one language type to which a present query speech belongs according to the present query speech of a user and user description information, wherein the at least one language type include mandarin and at least one dialect  — S110 determining a speech error-correction model corresponding to each of the at least one language type  — S120 performing speech analysis on the present query speech by using the determined speech error-correction models, and performing speech error-correction based on a result of the speech analysis  — S130

(56) References Cited

U.S. PATENT DOCUMENTS

| | | | |
|---|---|---|---|
| 9,697,824 B1* | 7/2017 | Chen | G01C 21/3608 |
| 9,966,065 B2* | 5/2018 | Gruber | G06F 40/205 |
| 10,403,291 B2* | 9/2019 | Moreno | G10L 17/22 |
| 2007/0136273 A1* | 6/2007 | Rehberg | G06F 40/186 |
| 2008/0052073 A1* | 2/2008 | Goto | G10L 15/06 |
| | | | 704/251 |
| 2008/0162137 A1* | 7/2008 | Saitoh | G10L 15/22 |
| | | | 704/251 |
| 2009/0228274 A1* | 9/2009 | Terrell, II | G10L 15/22 |
| | | | 704/235 |
| 2010/0131900 A1* | 5/2010 | Spetalnick | G06F 40/274 |
| | | | 715/825 |
| 2011/0307241 A1* | 12/2011 | Waibel | G10L 15/06 |
| | | | 704/2 |
| 2011/0320203 A1 | 12/2011 | Reich | |
| 2013/0035936 A1* | 2/2013 | Garland | G10L 15/26 |
| | | | 704/235 |
| 2014/0236595 A1* | 8/2014 | Gray | G10L 15/30 |
| | | | 704/235 |
| 2014/0272821 A1* | 9/2014 | Pitschel | G09B 19/06 |
| | | | 434/157 |
| 2015/0006170 A1* | 1/2015 | Caskey | G09B 19/06 |
| | | | 704/235 |
| 2017/0193990 A1 | 7/2017 | Gray | |
| 2018/0341702 A1* | 11/2018 | Sawruk | G06N 3/0454 |
| 2018/0373576 A1* | 12/2018 | Yao | G06F 9/453 |
| 2019/0050639 A1* | 2/2019 | Ast | G06N 5/046 |
| 2019/0147100 A1* | 5/2019 | Li | G06F 16/211 |
| | | | 706/61 |
| 2019/0189116 A1 | 6/2019 | Li et al. | |
| 2020/0364303 A1* | 11/2020 | Liu | G06N 3/0454 |

FOREIGN PATENT DOCUMENTS

| | | |
|---|---|---|
| CN | 104464736 A | 3/2015 |
| CN | 105047198 A | 11/2015 |
| CN | 105469801 A | 4/2016 |
| CN | 106534548 A | 3/2017 |
| CN | 108053823 A | 5/2018 |
| CN | 108595412 A | 9/2018 |
| CN | 109346059 A | 2/2019 |
| CN | 109410664 A | 3/2019 |
| CN | 109461436 A | 3/2019 |
| CN | 109545184 A | 3/2019 |
| CN | 109545189 A | 3/2019 |
| CN | 109922371 A | 6/2019 |
| CN | 110021293 A | 7/2019 |
| CN | 111369981 A | 7/2020 |

OTHER PUBLICATIONS

Chinese Patent Application No. 201910677736.5 English translation of Office Action dated Jun. 11, 2021, 8 pages.

* cited by examiner

SPEECH ERROR-CORRECTION METHOD, DEVICE AND STORAGE MEDIUM

CROSS-REFERENCE TO RELATED APPLICATION

This application claims priority and benefits of Chinese Patent Application Serial No. 201910677736.5, filed on Jul. 25, 2019, the entire content of which is incorporated herein by reference.

FIELD

The present disclosure relates to a computer technology field, and more particularly to a speech error-correction method, device and storage medium.

BACKGROUND

In the human-computer interaction scene based on speech, accurate recognition of user's speech is an important part to ensure an interaction process progressed smoothly. With the development of speech interaction technology, user's speech can be automatically corrected in a process of recognizing the user's speech, thus implementing an accurate prediction of user's semantic, ensuring interactive experience of the user.

However, current speech error-correction methods are general error-correction methods that is universally applicable to the general public, but not differentiated speech error-correction method for specific users in the field of speech error-correction.

SUMMARY

Embodiments of the present disclosure provide a speech error-correction method, device and storage medium, in order to implement personalized speech error-correction for different users and improve the accuracy of the speech error-correction.

In a first aspect, embodiments of the present disclosure provide a speech error-correction method. The method includes: determining at least one language type to which a present query speech belongs according to the present query speech of a user and user description information, wherein the at least one language type include mandarin and at least one dialect; determining a speech error-correction model corresponding to each of the at least one language type; performing speech analysis on the present query speech by using the determined speech error-correction models, and performing speech error-correction based on a result of the speech analysis.

In a second aspect, embodiments of the present disclosure provide a device. The device includes: one or more processors; and a storage apparatus, configured to store one or more programs. When the one or more programs are executed by the one or more processors, the one or more processors are caused to implement a speech error-correction method, the method includes: determining at least one language type to which a present query speech belongs according to the present query speech of a user and user description information, wherein the at least one language type include mandarin and at least one dialect; determining a speech error-correction model corresponding to each of the at least one language type; performing speech analysis on the present query speech by using the determined speech error-correction models, and performing speech error-correction based on a result of the speech analysis.

In a third aspect, embodiments of the present disclosure provide a computer readable storage medium having a computer program stored thereon. When the computer program is executed by a processor, a speech error-correction method is implemented, the speech error-correction method includes: determining at least one language type to which a present query speech belongs according to the present query speech of a user and user description information, wherein the at least one language type include mandarin and at least one dialect; determining a speech error-correction model corresponding to each of the at least one language type; performing speech analysis on the present query speech by using the determined speech error-correction models, and performing speech error-correction based on a result of the speech analysis.

With embodiments of the present disclosure, at least one language type to which the present query speech of the user belongs is determined according to the present query speech and the user description information of the user, for example, the present query speech issued by the user belongs to mandarin or dialect, then the speech error-correction is performed on the present query speech by using each speech error-correction model corresponding to each language type, thereby implementing personalized speech error-correction for different users, improving the accuracy of the speech error-correction, and making it possible to accurately respond to a query requirement of the user in any speech query scene.

DETAILED DESCRIPTION

Figure 1:
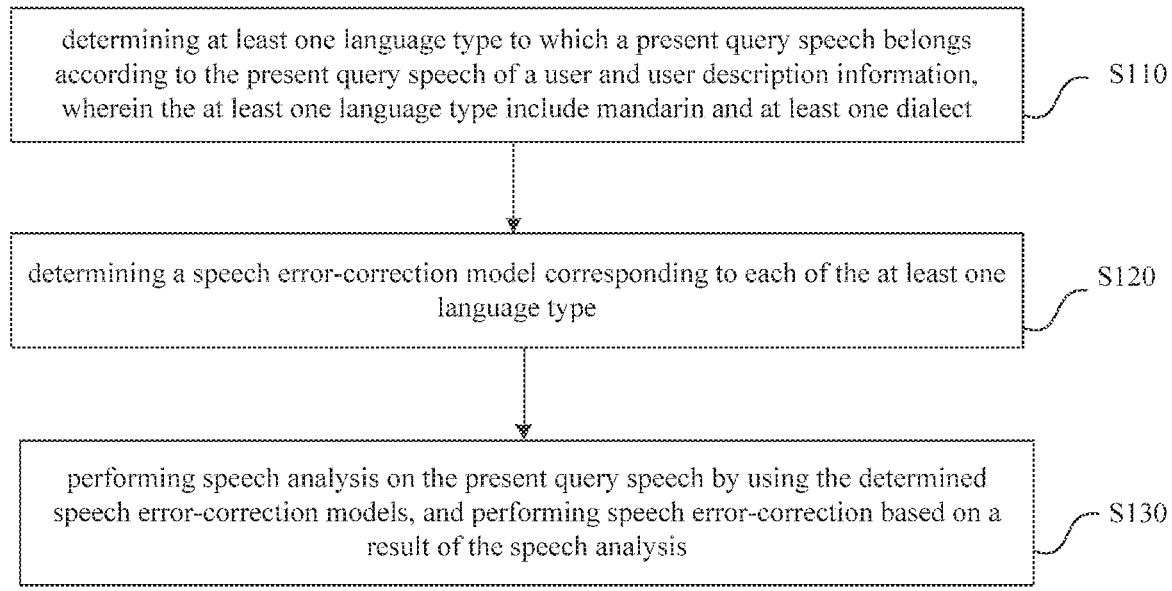
FIG. 1 is a flow chart illustrating a speech error-correction method provided in Embodiment 1 of the present disclosure.

Description will be made in detail below to the present disclosure with reference to the embodiments and the drawings. It should be understood that, detailed embodiments described herein are intended only to explain the present disclosure, and are not a limitation of the present disclosure. In addition, it should be further noted that, for the convenience of description, only some but not all of the structure related to the present disclosure are illustrated in the drawings.

Embodiment 1

FIG. 1 is a flow chart illustrating a speech error-correction method provided in Embodiment 1 of the present disclosure. The embodiment may be applicable to a case that for a specific user, error-correction is performed on a speech of the user, combining the user's own personalized information, in speech interaction scene. The method may be executed by a speech error-correction apparatus. The apparatus may be implemented in form of software and/or hardware, and may be integrated on any device with computing power, including but not limited to a server and so on.

As illustrated in FIG. 1, the speech error-correction method provided by this embodiment may include acts in the following blocks.

At block S110, at least one language type to which a present query speech belongs is determined according to the present query speech of a user and user description information, wherein the at least one language type include mandarin and at least one dialect.

In the speech interaction scene, the query speech of the user carries query requirement of the user. The user description information is used to represent personalized information related to the user, and may be used to assist in predicting the language type to which the present query speech of the user belongs. The user description information may include at least one of user profile features, present location information, and historical query speech. The user profile features may include but are not limited to multiple candidate geographic regions where the user historically is located, multiple candidate language types, and personal information. The personal information of the user includes but is not limited to age, profession, education level, household registration and other information.

In the query scene related to location, such as, travel destination query or catering service query and so on, the present location information of the user may be used to determine whether the present query speech of the user belongs to the local language of the present location. The historical query speech of the user refers to the query speech of the user collected by speech query service during a preset historical period, such as one month prior to the present time. Considering that the language used by the user usually does not change abruptly, taking the historical query speech of the user as a factor to predict the present language type is contributed to improve accuracy of prediction of the language type. The multiple candidate geographic regions and multiple candidate language types included in the user profile features refer to the geographical regions frequently occurred by the user and the language types frequently used by the user, that are obtained based on analysis and statistics of user information, for instance, based on analysis of a historical speech query log of the query service used by the user. The candidate geographic region and candidate language type may provide a preliminary range of language prediction for predicting the language type. For example, the user frequently occurs in city X, and the language type possibly used by the user may include the mandarin and the dialect of city X. Personal information of the user may be obtained through personal data in the speech query service. There is a direct correlation between the personal information of the user and the language type customarily used by user, for instance, there is a higher probability to use the Mandarin for younger users, some specific profession types determine the language type used by the user, there is a larger probability to use local dialect in the place of the household registration, and so on. Considering the personal information of the user is also contributed to improve accuracy of prediction of the language type.

At block S120, each speech error-correction model is determined corresponding to each language type.

The speech error-correction model is used to perform recognition and correction on the speech having ambiguity or having mispronunciation in the present query speech of the user, at least according to a pronunciation characteristic of the present query speech of the user, semantic of the present query speech, and other information, so that the query service can accurately respond to the query requirement of the user. In the embodiment, for different language types, corresponding speech error-correction model can be trained in advance based on a machine learning algorithm and using corpus of the language type, such as the speech error-correction model for mandarin, the speech error-correction model for dialects of different provinces and cities, namely, there is a one-to-one corresponding relationship between the speech error-correction model and the language type. Different language types correspond to different pronunciation characteristics, and implementing the speech error-correction specific to a particular language type may reduce the difficulty to implement the speech error-correction, and narrow the speech screening scope of the speech error-correction. For example, under different language types, same pronunciation but different words, and similar pronunciation and other cases may not be same. Specific to a particular language type, a proportion of the speech screening in the process of the speech error-correction may be reduced. Also, the present language type is determined according to user information, when performing error-correction using the error-correction model corresponding to the language type, it can well adapt to accent of the user, avoid that the accent problem of the user results in a condition of lower accuracy of the speech error-correction, thereby improving the accuracy of the personalized speech error-correction.

At block S130, speech analysis is performed on the present query speech by using the determined speech error-correction models, and speech error-correction is performed based on a result of the speech analysis.

In the process of performing speech error-correction on the present query speech by using the trained speech error-correction model, the speech error-correction model may perform the speech analysis on the present query speech of the user layer by layer. The result of the speech analysis includes, but is not limited to, a pronunciation trait, a semantic analysis feature, a language model feature, and an error-correction probability of each word in speech of the present query speech. Then the speech error-correction is performed on the present query speech of the user according to the result of the speech analysis, so that the error-corrected query speech may accurately represent the present query requirement of the user. The semantic analysis feature of the present query speech includes grammatical components in the present query speech, and a preliminary query requirement (that is equivalent to considering context information of the query speech) of the user. The language model feature of the present query speech is used to represent a fluent degree of the semantic of the present query speech. If the fluent degree of the semantic is poorer, the probability of needing to perform the speech error-correction is higher. After the speech error-correction model recognizes respective words included in the present query speech of the user, analyzing the probability of error-correction of each word in a process of historical speech query is continued. A word with a higher probability of error-correction has a higher probability of needing to perform the error-correction in the process of the present speech query. The word with a higher probability of error-correction is related to the pronunciation trait of the speech of the user himself, and may be any word in the present query speech of the user.

Exemplarily, the speech analysis is performed on the present query speech by using the determined speech error-correction models, and the speech error-correction is performed on a query keyword in the present query speech based on the result of the speech analysis. After the speech error-correction model determines the result of the speech analysis of the user's present query speech, the query keyword in the query speech may be determined, and the speech error-correction is directly performed on the query keyword, which may improve the efficiency of error-correction, and improve the accuracy of error-corrected object. For example, when the user uses a map application to perform a process of querying a Point of Interest (POI), the map application obtains the present query speech about the POI, a correction is performed on a speech fragment about the POI in the present query speech by using the speech error-correction model corresponding to the present language type of the user, and an objective POI which is queried by user is accurately recognized. For example, the user uses the map application to search for a town in Hunan, but the user pronounces "hu" as "fu", and "fu" may be corrected to "hu" by preforming the error-correction through the speech error-correction model, so that the query requirement of the user for the town in Hunan is accurately recognized.

When the error-correction is performed on the present query speech by using multiple speech error-correction models, multiple results of the error-correction are obtained, and a final result of the error-correction may be determined by a fusion of the results of the error-correction, for example, performing a screening on the results of the error-correction based on a preset screening strategy or merging the results of the error-correction based on a preset merging strategy. On the basis of ensuring the accuracy of the final result of the error correction, specific contents of the preset screening strategy and the preset merging strategy are not specifically limited in this embodiment.

On the basis of the above technical solution, further, the training process of the speech error-correction model may be as follows.

For each language type, a training set for each language type is constructed by using speech similarity features between different speeches in the language type and analysis features between an original query speech and a corrected objective query speech (namely, the speech obtained after correcting the original query speech) under the language type.

The speech error-correction model corresponding to each language type is trained by using the training set for each language type and the machine learning algorithm.

The analysis features between an original query speech and the corrected objective query speech under the language type include but are not limited to, query frequency features, satisfaction features, semantic analysis features, and language model features of each of the original query speech and the corrected objective query speech, and an edit distance feature between the original query speech and the corrected objective query speech, and the satisfaction features and the query frequency features of speech fragments at a speech correcting position respectively corresponding to the original query speech and the corrected objective query speech. In the training process of the speech error-correction model, the user may add or modify the analysis features between the original query speech and the corrected objective query speech according to the specific requirements for model training.

In the above analysis features, the query frequency features of the original query speech and the corrected objective query speech respectively refer to, for different querying users, in the preset historical period (the time value may be set flexibly), a total number of times that the original query speech is used for query as a whole, and after the original query speech is corrected to the objective query speech, a total number of times that the objective query speech is used for query as a whole.

The satisfaction features of the original query speech and the corrected objective query speech respectively refer to, in the preset historical period, satisfaction statistics of the original query speech and satisfaction statistics of the corrected objective query speech. The satisfaction may be calculated as a quotient between a frequency that the query requirements of the user are satisfied and a total frequency of the queries of the user, with the user performing query based on the original query speech or the objective query speech. Whether the query requirement of the user is satisfied depends on whether the user further performs an operation related to a query feedback result based on the query feedback result. For example, if a navigation is initiated based on an objective location of the speech query of the user, it means that the present query requirement of the user is satisfied, and if the query speech is changed by the user or the present speech query is interrupted by the user, it means that the present query requirement of the user is not satisfied.

The query frequency features of the speech fragments at the speech correcting position respectively corresponding to the original query speech and the corrected objective query speech refer to, for different querying users, in the preset historical period, a total number of times that the original speech fragment at the speech correcting position of the original query speech is used for query, and after the original query speech is corrected to the objective query speech, a total number of times that the corrected speech fragment at the same correcting position is used for query.

The satisfaction features of the speech fragments at the speech correcting position respectively corresponding to the original query speech and the corrected objective query speech refer to, in the preset historical period, satisfaction statistics of the original speech fragment at the speech correcting position of the original query speech, and satisfaction statistics of the corrected speech fragment corresponding to the original speech fragment. The satisfaction may be calculated as the quotient between the frequency that the query requirements of the user are satisfied and the total frequency of the queries of the user, with the user performing query based on the original speech fragment or the corrected speech fragment.

In the training process of the speech error-correction model, available machine learning algorithms include any classification and ranking algorithm, such as the Learning to Rank algorithm based on regression (GBRank), the Gradient Boosted Decision Trees (GBDT), the Support Vector Machine (SVM) classification algorithm, etc.

With the technical solution of this embodiment, at least one language type to which the present query speech of the user belongs is predicted according to the present query speech of the user and the user description information, for example, the present query speech issued by the user belongs to mandarin or dialect, then the error-correction is performed on the present query speech by using each speech error-correction model corresponding to each language type, thereby implementing personalized speech error-correction for different users. Meanwhile, performing the speech error-correction is specific to the particular language type, thus reducing the proportion of the speech screening in the process of the speech error-correction, also adapting to different accents of different users, avoiding that the accent problem of the user results in the condition of lower accuracy of the speech error-correction, improving the accuracy of the speech error-correction, so as to make it possible to accurately respond to the query requirement of the user in any speech query scene.

Embodiment 2

Figure 2:
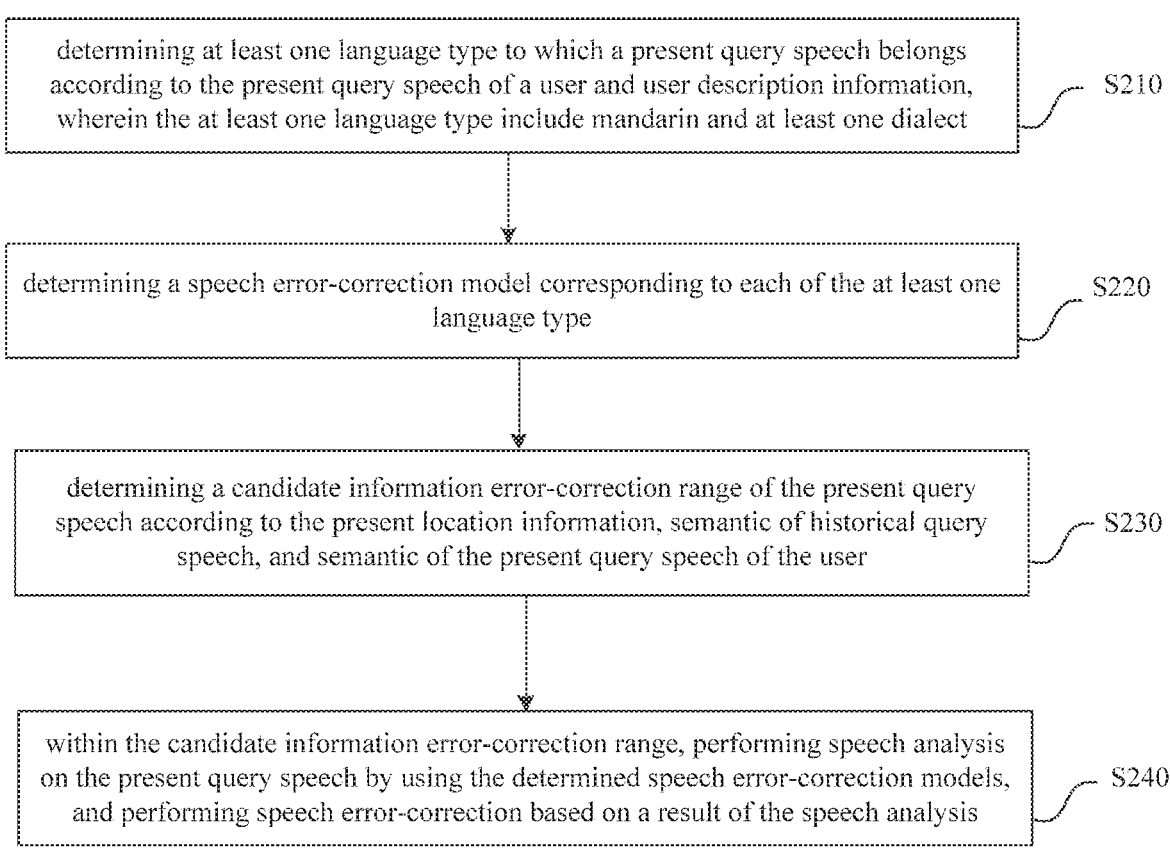
FIG. 2 is a flow chart illustrating a speech error-correction method provided in Embodiment 2 of the present disclosure.

FIG. 2 is a flow chart illustrating a speech error-correction method provided in Embodiment 2 of the present disclosure. This embodiment is further optimized and extended on the basis of the above embodiment. As illustrated in FIG. 2, the method may include acts in the following blocks.

At block S210, at least one language type to which a present query speech belongs is determined according to the present query speech of a user and user description information, wherein the at least one language type include mandarin and at least one dialect.

Exemplarily, at least one language type to which the present query speech belongs may be determined according to the present query speech of the user and the user description information, and by using a pre-trained language type analysis model. The language type analysis model is used to predict the language type to which the present query speech belongs. The training process of the language type analysis model includes training the language type analysis model by using machine learning, with the query speech and the user description information of multiple sample users (that refers to the query user whose query speech is used for model training) as input, and the language type labeling results (that is the specific language type of the sample user) of the multiple sample users as output. The user description information may include at least one of user profile features, present location information, and historical query speech. The user profile features may include but are not limited to multiple candidate geographic regions where the sample user historically is located, multiple candidate language types, and personal information and so on. The personal information includes but is not limited to age, profession, education level, household registration and other information.

In the training process of the language type analysis model, available machine learning algorithms include any classification and ranking algorithm, such as the Learning to Rank algorithm based on regression (GBRank), the Gradient Boosted Decision Trees (GBDT), the Support Vector Machine (SVM) classification algorithm, etc. This embodiment is not specific limited.

At block S210, each speech error-correction model corresponding to each language type is determined.

At block S230, a candidate information error-correction range of the present query speech is determined according to the present location information, semantic of historical query speech, and semantic of the present query speech of the user.

In the query scene related to location, the historical query requirement of the user may be determined by using the semantic of the historical query speech of the user, for example, which objective POIs are historically queried by user, which catering shops are historically queried by user, thereby predicting query preference or query propensity of the user. Then the candidate information error-correction range of the present query speech of the user is determined, in combination with the semantic of the present query speech of the user (that may determine the query requirement of the user) and the present location information (the present query requirement is usually related to the present location information), in which the candidate information error-correction range represents the range to which the query information may belong after the error-correction is performed on the query speech of the user, and the candidate information error-correction range may be implemented in the form of information list, thereby reducing difficulty of the error-correction, reducing selection range of speech information of the speech error-correction, avoiding a blind searching in the mass of information, so as to improve pertinence of the error-correction and efficiency of the error-correction. In addition, when the language type of the user is determined to belong to a dialect, the location of the dialect may also be considered as a factor of determining the candidate information error-correction range. For example, the user speaks the dialect of city A, and it is a greater possible for speech to query relevant information of city A.

At block S240, within the candidate information error-correction range, the speech analysis is performed on the present query speech by using the determined speech error-correction models, and the speech error-correction is performed based on a result of the speech analysis.

Namely, within the candidate information error-correction range, the speech error-correction is performed on the present query speech by using the determined speech error-correction models. Exemplarily, in the query scene of the map application, the candidate information error-correction range includes a POI candidate error-correction regional range or a POI candidate error-correction list of the name of the POI contained in the present query speech, and the query keyword includes the name of the POI, then within the determined POI candidate error-correction regional range, the speech analysis is performed on the present query speech by using the determined at least one speech error-correction model, and the speech error-correction is performed on the name of the POI in the present query speech based on the result of the speech analysis.

For instance, take an example that the present location information of the user is city A, the user uses the map application to query the objective POI, the objective POI is "jinhu community in puzhuang town", by reason of the poor pronunciation of the user and based on the present query speech of the user, the present query of the user is preliminarily recognized as "jinfu community in puzhuang town". The implementation process of the speech error-correction of this embodiment is illustrated as an example.

1) Based on semantic understanding, it may be confirmed that what the user is presently querying is a community of "puzhuang town, wuzhong district, city B";

2) Based on the present query speech of the user, and user description information (it includes the user profile features, the present location information, and the historical query speech), and by using the language type analysis model, it is determined that the present query speech of the user belongs to the language type of "mandarin".

3) Based on the present location information of the user, the semantic of historical query speech, and the semantic of the present query speech, the POI candidate error-correction regional range is limited to "puzhuang town, wuzhong district, city B" and "city A".

4) Based on the speech error-correction model corresponding to the language type of the mandarin, within the geographical region determined by "puzhuang town, wuzhong district, city B" and "city A", the speech error-correction is performed on the name of the POI in the present query speech, and finally, "puzhuang town, jinhu community" is selected as the error-correction result with the highest confidence. When multiple error-correction results are determined by using the speech error-correction model, the objective error-correction result may be selected according to the confidence corresponding to each error-correction result.

On the basis of the above technical solution, optionally, the method may further include: determining the objective error-correction result from the results of the speech error-correction performed on the present query speech by using each speech error-correction model, according to the confidence of each speech error-correction model; or displaying the results of speech error-correction performed on the present query speech by using each speech error-correction model, and determining the objective error-correction result from the displayed results of the speech error-correction based on a selecting operation of the user.

When the predicted language type to which the present query speech of the user belongs is multiple, there also exists multiple corresponding speech error-correction models. After performing speech error-correction on the present query speech by using each speech error-correction model, multiple error-correction results corresponding to multiple speech error-correction models may be obtained. The objective error-correction result may be automatically selected according to the confidence (the confidence may be used to represent the accuracy of the model error-correction) of each speech error-correction model. Alternatively, multiple error-correction results are displayed visually, and the objective error-correction result is determined based on the user's choice among multiple display results. In this way, a query feedback is performed based on the objective error-correction result.

With the technical solution of this embodiment, at least one language type to which the present query speech of the user belongs is predicted according to the present query speech of the user and the user description information, then the error-correction is performed on the present query speech by using each speech error-correction model corresponding to each language type, within the determined candidate information error-correction range, thereby implementing personalized speech error-correction for different users, reducing selection range of speech information of the speech error-correction, improving the pertinence of the error-correction and the efficiency of the error-correction. Meanwhile, performing the speech error-correction is specific to the particular language type, thus reducing the proportion of the speech screening in the process of the speech error-correction, also adapting to different accents of different users, avoiding that the accent problem of the user results in the condition of lower accuracy of the speech error-correction in universal speech error-correction methods, improving the accuracy of the speech error-correction, so as to make it possible to accurately respond to the query requirement of the user in any speech query scene.

Embodiment 3

Figure 3:
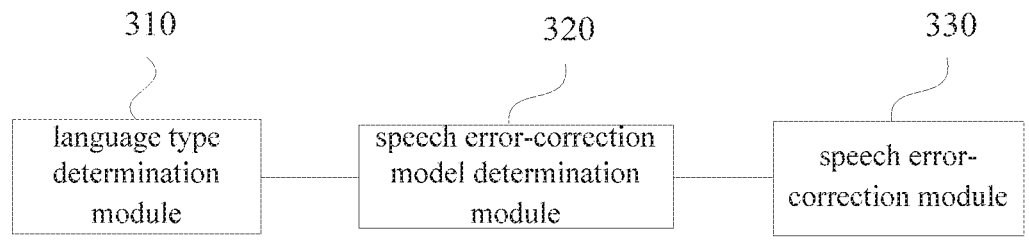
FIG. 3 is a block diagram illustrating a speech error-correction apparatus provided in Embodiment 3 of the present disclosure.

FIG. 3 is a block diagram illustrating a speech error-correction apparatus provided in Embodiment 3 of the present disclosure. The embodiment may be applicable to a case that for a specific user, error-correction is performed on a speech of the user, combining the user's own personalized information, in speech interaction scene. The method may be executed by a speech error-correction apparatus. The speech error-correction apparatus provided in this embodiment may be implemented in form of software and/or hardware, and may be integrated on any device with computing power, including but not limited to a server and so on.

As illustrated in FIG. 3, the speech error-correction apparatus provided in this embodiment includes a language type determination module 310, a speech error-correction model determination module 320, and a speech error-correction module 330.

The language type determination module 310 is configured to determine at least one language type to which a present query speech belongs according to the present query speech of a user and user description information, wherein the language types include mandarin and at least one dialect.

The speech error-correction model determination module 320 is configured to determine each speech error-correction model corresponding to each language type.

The speech error-correction module 330 is configured to perform speech analysis on the present query speech by using the determined speech error-correction model, and perform speech error-correction based on a result of the speech analysis.

Alternatively, the speech error-correction module 330 is further configured to perform the speech analysis on the present query speech by using the determined speech error-correction models, and perform the speech error-correction on a query keyword in the present query speech based on the result of the speech analysis, wherein the query keyword includes a name of a POI.

Alternatively, the user description information includes at least one of user profile features, present location information, and historical query speech.

Alternatively, the apparatus further includes a candidate information error-correction range determination module.

Before the speech error-correction module 330 performs the speech analysis on the present query speech by using the determined speech error-correction models and performs the speech error-correction based on a result of the speech analysis, the candidate information error-correction range determination module determines a candidate information error-correction range of the present query speech according to the present location information, semantic of historical query speech, and semantic of the present query speech of the user, so that within the candidate information error-correction range, the speech error-correction module 330 performs the speech error-correction on the present query speech by using the determined speech error-correction models.

Alternatively, the candidate information error-correction range includes POI candidate error-correction regional range of the name of the POI contained in the present query speech.

Alternatively, the language type determination module 310 is specifically configured to determine at least one language type to which the present query speech belongs according to the present query speech and the user description information of the user, and by using a pre-trained language type analysis model.

Alternatively, the apparatus further includes a language type analysis model training module.

The language type analysis model training module is configured to train the language type analysis model by using machine learning, with the query speech and the user description information of multiple sample users as an input, and language type labeling results of the multiple sample users as an output.

Alternatively, the apparatus further includes a speech error-correction model training module, which is configured to train the speech error-correction model. The speech error-correction model training module include a training set construction unit and a model training unit.

The training set construction unit is configured to construct a training set for each language type by using speech similarity features between different speeches in the language type and analysis features between an original query speech and a corrected objective query speech under the language type.

The model training unit is configured to train the speech error-correction model corresponding to each language type, by using the training set for each language type and the machine learning algorithm.

The analysis features between the original query speech and the corrected objective query speech under the language type includes query frequency features, satisfaction features, semantic analysis features, and language model features of each of the original query speech and the corrected objective query speech, and an edit distance feature between the original query speech and the corrected objective query speech, and the satisfaction features and the query frequency features of speech fragments at a speech correcting position respectively corresponding to the original query speech and the corrected objective query speech.

Alternatively, within the speech error-correction module 330, the result of the speech analysis includes a pronunciation trait, a semantic analysis feature, a language model feature, and an error-correction probability of each word in speech of the present query speech.

Alternatively, the apparatus further includes an objective error-correction result determination module or an error-correction result display module.

The objective error-correction result determination module is configured to determine an objective error-correction result from the results of the speech error-correction performed on the present query speech by using each speech error-correction model, according to confidence of each speech error-correction model.

The error-correction result display module is configured to display the results of speech error-correction performed on the present query speech by using each speech error-correction model, and determine an objective error-correction result from the displayed results of the speech error-correction based on a selecting operation of the user.

Alternatively, the user profile features include multiple candidate geographic regions where the user historically is located, multiple candidate language types, and personal information.

The speech error-correction apparatus provided in embodiments of the present disclosure may execute the speech error-correction method provided in any embodiment of the present disclosure. The apparatus possesses corresponding functional modules and beneficial effects for executing method. The content which is not described in detail in this embodiment may refer to the description in any method embodiment of the present disclosure.

Embodiment 4

Figure 4:
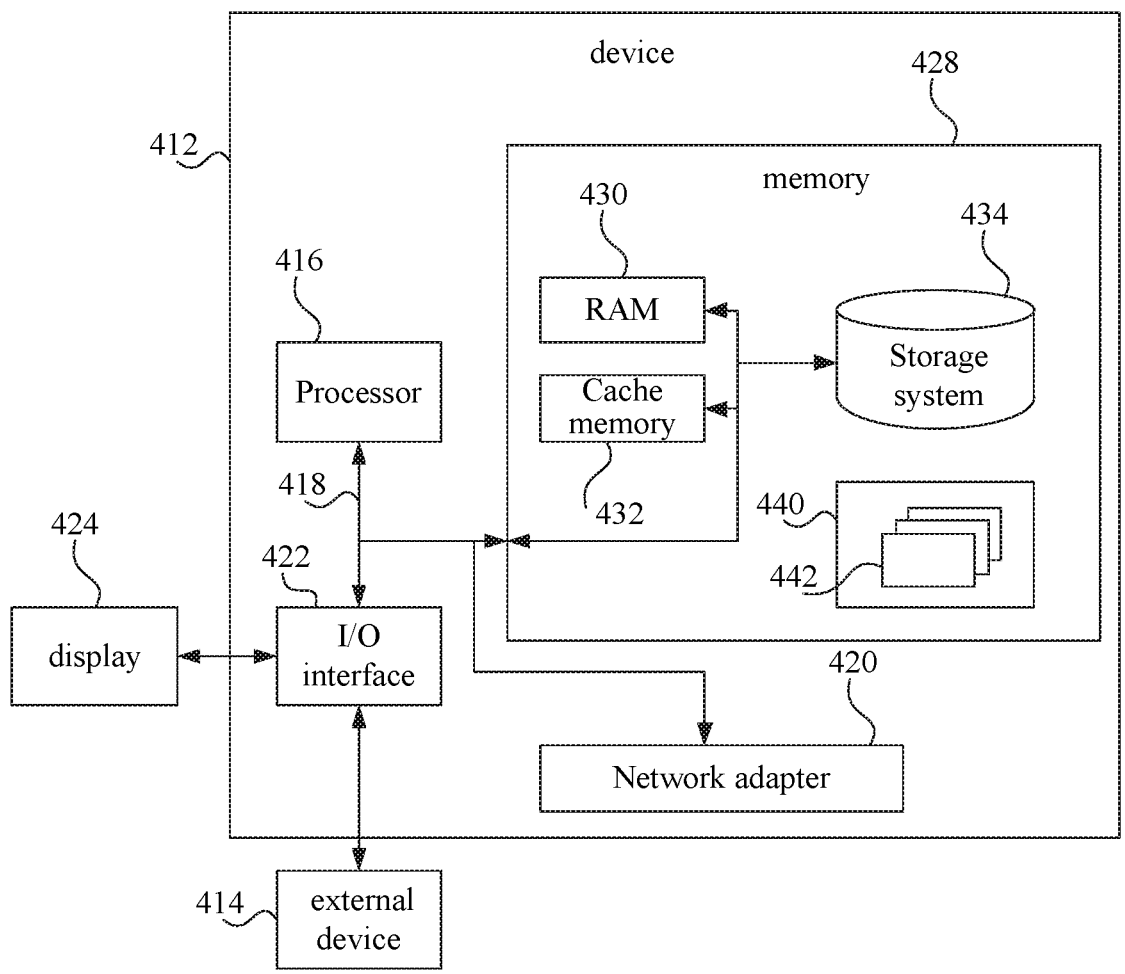
FIG. 4 is a block diagram illustrating a device provided in Embodiment 4 of the present disclosure.

FIG. 4 is a block diagram illustrating a device provided in Embodiment 4 of the present disclosure. FIG. 4 illustrates a block diagram of an exemplary device 412 suitable for realizing implementations of the present disclosure. The device 412 illustrated in FIG. 4 is merely an example, which should not be understood to bring any limitation to functions and application scope of embodiments of the present disclosure. The device 412 may be any device with computing power, including but not limited to a server and so on.

As illustrated in FIG. 4, the device 412 is represented in a form of a general computer device. Components of the device 412 may include but may not be limited to one or more processors or processing units 416, a system memory 428, and a bus 418 connecting various system components (including the system memory 428 and the processing units 416).

The bus 418 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and a Peripheral Component Interconnection (PCI) bus.

The device 412 typically includes a variety of computer system readable media. These media may be any available media accessible by the device 412 and include both volatile and non-volatile media, removable and non-removable media.

The system memory 428 may include a computer system readable medium in the form of volatile memory, such as a random access memory (hereinafter referred to as RAM) 430 and/or a high speed cache memory 432. The device 412 may further include other removable or non-removable, volatile or non-volatile computer system storage media. By way of example only, the storage system 434 may be configured to read from and write to a non-removable and non-volatile magnetic media (not shown in FIG. 4, commonly referred to as a "hard drive"). Although not shown in FIG. 4, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 418 via one or more data medium interfaces. The memory 428 may include at least one program product. The program product has a set (such as, at least one) of program modules configured to perform the functions of various embodiments of the present disclosure.

A program/utility 440 having a set (at least one) of program modules 442 may be stored in, for example, the memory 428. The program modules 442 include but are not limited to, an operating system, one or more application programs, other programs modules, and program data. Each of these examples, or some combination thereof, may include an implementation of a network environment. The program modules 442 generally perform the functions and/or methods in the embodiments described herein.

The device 412 may also communicate with one or more external devices 414 (such as, a keyboard, a pointing device, a display 424, etc.). Furthermore, the device 412 may also communicate with one or more communication devices enabling a user to interact with the device 412 and/or other devices (such as a network card, modem, etc.) enabling the device 412 to communicate with one or more other computer devices. This communication can be performed via the input/output (I/O) interface 422. Also, the device 412 may communicate with one or more networks (such as a local area network, a wide area network and/or a public network such as an Internet) through a network adapter 420. As illustrated, the network adapter 420 communicates with other modules of the device 412 via the bus 18. It should be understood that, although not shown, other hardware and/or software modules may be used in connection with the device 412 The hardware and/or software includes, but is not limited to, microcode, device drivers, redundant processing units, external disk drive arrays, RAID systems, tape drives and data backup storage systems.

The processing unit 416 is configured to execute various functional applications and data processing by running programs stored in the system memory 428, thus implementing the above mentioned speech error-correction method.

The method includes: determining at least one language type to which a present query speech belongs according to the present query speech of a user and user description information, wherein the language types include mandarin and at least one dialect; determining each speech error-correction model corresponding to each language type; performing speech analysis on the present query speech by using the determined speech error-correction models, and performing speech error-correction based on a result of the speech analysis.

Embodiment 5

Embodiments of the present disclosure further provide a computer readable storage medium, storing computer programs thereon. When the computer programs are executed by a processor, the above-mentioned method for the speech error-correction method is performed.

The method includes: determining at least one language type to which a present query speech belongs according to the present query speech of a user and user description information, wherein the language types include mandarin and at least one dialect; determining each speech error-correction model corresponding to each language type; performing speech analysis on the present query speech by using the determined speech error-correction models, and performing speech error-correction based on a result of the speech analysis.

The storage medium provided by embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A speech error-correction method, comprising:
    determining at least one language type to which a present query speech belongs according to the present query speech of a user and user description information, wherein the at least one language type include mandarin and at least one dialect;
    determining a speech error-correction model corresponding to each of the at least one language type;
    performing speech analysis on the present query speech by using the determined speech error-correction models, and performing speech error-correction based on a result of the speech analysis;
    wherein, performing speech analysis on the present query speech by using the determined speech error-correction models, and performing speech error-correction based on a result of the speech analysis, comprises:
    performing the speech analysis on the present query speech by using the determined speech error-correction models, and performing the speech error-correction on a query keyword in the present query speech based on the result of the speech analysis, wherein the query keyword comprises a name of a point of interest POI;
    wherein, determining at least one language type to which the present query speech belongs according to the present query speech of the user and user description information, comprises:
    determining at least one language type to which the present query speech belongs according to the present query speech and the user description information of the user and by using a pre-trained language type analysis model;

wherein the speech error-correction model corresponding to each language type is trained via a training set for each language type and a machine learning algorithm;

the language type analysis model is trained via machine learning, with query speech and user description information of multiple sample users as input, and language type labeling results of multiple sample users as output.

2. The method of claim 1, wherein, the user description information comprises at least one of user profile features, present location information, and historical query speech.

3. The method of claim 2, before performing speech analysis on the present query speech by using the determined speech error-correction models, and performing speech error-correction based on a result of the speech analysis, further comprising:

determining a candidate information error-correction range of the present query speech according to the present location information, semantic of historical query speech, and semantic of the present query speech of the user, and within the candidate information error-correction range, performing the speech error-correction on the present query speech by using the determined speech error-correction models.

4. The method of claim 3, wherein, the candidate information error-correction range comprises a POI candidate error-correction regional range of the name of the POI contained in the present query speech.

5. The method of claim 2, wherein, the user profile features comprise: multiple candidate geographic regions where the user historically is located, multiple candidate language types, and personal information.

6. The method of claim 1, wherein, training process of the language type analysis model, comprises:

training the language type analysis model by using machine learning, with query speech and the user description information of multiple sample users as an input, and language type labeling results of the multiple sample users as an output.

7. The method of claim 1, wherein, training process of the speech error-correction model comprises:

for each language type, constructing training set for each language type by using speech similarity features between different speeches in the language type and analysis features between an original query speech and a corrected objective query speech under the language type;

training the speech error-correction model corresponding to each language type, by using the training set for each language type and a machine learning algorithm;

wherein, the analysis features between the original query speech and the corrected objective query speech under the language type comprise: query frequency features, satisfaction features, semantic analysis features, and language model features of each of the original query speech and the corrected objective query speech, and an edit distance feature between the original query speech and the corrected objective query speech, and the satisfaction features and the query frequency features of speech fragments at a speech correcting position respectively corresponding to the original query speech and the corrected objective query speech.

8. The method of claim 1, wherein, the result of the speech analysis comprises: a pronunciation trait, a semantic analysis feature, a language model feature, and an error-correction probability of each word in speech of the present query speech.

9. The method of claim 1, further comprising:

determining an objective error-correction result from the results of the speech error-correction performed on the present query speech by using each speech error-correction model, according to a confidence of each speech error-correction model; or displaying the results of speech error-correction performed on the present query speech by using each speech error-correction model, and determining an objective error-correction result from the displayed results of the speech error-correction based on a selecting operation of the user.

10. A device, comprising:

one or more processors;

a storage apparatus, configured to store one or more programs;

wherein, when the one or more programs are executed by the one or more processors, the one or more processors are caused to implement a speech error-correction method comprising:

determining at least one language type to which a present query speech belongs according to the present query speech of a user and user description information, wherein the at least one language type include mandarin and at least one dialect;

determining a speech error-correction model corresponding to each of the at least one language type;

performing speech analysis on the present query speech by using the determined speech error-correction models, and performing speech error-correction based on a result of the speech analysis;

wherein, performing speech analysis on the present query speech by using the determined speech error-correction models, and performing speech error-correction based on a result of the speech analysis, comprises:

performing the speech analysis on the present query speech by using the determined speech error-correction models, and performing the speech error-correction on a query keyword in the present query speech based on the result of the speech analysis, wherein the query keyword comprises a name of a point of interest POI;

wherein, determining at least one language type to which the present query speech belongs according to the present query speech of the user and user description information, comprises:

determining at least one language type to which the present query speech belongs according to the present query speech and the user description information of the user and by using a pre-trained language type analysis model;

wherein the speech error-correction model corresponding to each language type is trained via a training set for each language type and a machine learning algorithm;

the language type analysis model is trained via machine learning, with query speech and user description information of multiple sample users as input, and language type labeling results of multiple sample users as output.

11. The device of claim 10, wherein, the user description information comprises at least one of user profile features, present location information, and historical query speech.

12. The device of claim 11, before performing speech analysis on the present query speech by using the determined speech error-correction models, and performing speech error-correction based on a result of the speech analysis, further comprising:

determining a candidate information error-correction range of the present query speech according to the present location information, semantic of historical query speech, and semantic of the present query speech of the user, and within the candidate information error-correction range, performing the speech error-correction on the present query speech by using the determined speech error-correction models.

13. The device of claim 10, wherein, training process of the language type analysis model, comprises:

training the language type analysis model by using machine learning, with query speech and the user description information of multiple sample users as an input, and language type labeling results of the multiple sample users as an output.

14. The device of claim 10, wherein, training process of the speech error-correction model comprises:

for each language type, constructing training set for each language type by using speech similarity features between different speeches in the language type and analysis features between an original query speech and a corrected objective query speech under the language type;

training the speech error-correction model corresponding to each language type, by using the training set for each language type and a machine learning algorithm;

wherein, the analysis features between the original query speech and the corrected objective query speech under the language type comprise: query frequency features, satisfaction features, semantic analysis features, and language model features of each of the original query speech and the corrected objective query speech, and an edit distance feature between the original query speech and the corrected objective query speech, and the satisfaction features and the query frequency features of speech fragments at a speech correcting position respectively corresponding to the original query speech and the corrected objective query speech.

15. The device of claim 10, further comprising:

determining an objective error-correction result from the results of the speech error-correction performed on the present query speech by using each speech error-correction model, according to a confidence of each speech error-correction model; or displaying the results of speech error-correction performed on the present query speech by using each speech error-correction model, and determining an objective error-correction result from the displayed results of the speech error-correction based on a selecting operation of the user.

16. A non-transitory computer readable storage medium having a computer program stored thereon, wherein, when the computer program is executed by a processor, a speech error-correction method is implemented, the speech error-correction method comprising:

determining at least one language type to which a present query speech belongs according to the present query speech of a user and user description information, wherein the at least one language type include mandarin and at least one dialect;

determining a speech error-correction model corresponding to each of the at least one language type;

performing speech analysis on the present query speech by using the determined speech error-correction models, and performing speech error-correction based on a result of the speech analysis;

wherein, performing speech analysis on the present query speech by using the determined speech error-correction models, and performing speech error-correction based on a result of the speech analysis, comprises:

performing the speech analysis on the present query speech by using the determined speech error-correction models, and performing the speech error-correction on a query keyword in the present query speech based on the result of the speech analysis, wherein the query keyword comprises a name of a point of interest P01;

wherein, determining at least one language type to which the present query speech belongs according to the present query speech of the user and user description information, comprises:

determining at least one language type to which the present query speech belongs according to the present query speech and the user description information of the user and by using a pre-trained language type analysis model;

wherein the speech error-correction model corresponding to each language type is trained via a training set for each language type and a machine learning algorithm;

the language type analysis model is trained via machine learning, with query speech and user description information of multiple sample users as input, and language type labeling results of multiple sample users as output.

\* \* \* \* \*